United States Patent [19]

Byles

[11] Patent Number: 4,991,976
[45] Date of Patent: Feb. 12, 1991

[54] TEMPERATURE SENSOR PROBE APPARATUS AND METHOD FOR IMPROVING TIME RESPONSE

[75] Inventor: Joe D. Byles, Leander, Tex.

[73] Assignee: Weed Instruments Company, Inc., Round Rock, Tex.

[21] Appl. No.: 359,212

[22] Filed: May 31, 1989

[51] Int. Cl.$^5$ .................. G01K 1/16; G01K 13/02; G01K 1/18

[52] U.S. Cl. .................. 374/135; 374/208; 374/138; 136/230

[58] Field of Search .............. 374/185, 208, 138, 147, 374/148, 135, 54; 73/204.21; 136/232, 233, 234, 228, 230

[56] References Cited

U.S. PATENT DOCUMENTS

| | | | |
|---|---|---|---|
| 2,466,175 | 4/1949 | Kretsch et al. | 136/228 |
| 2,971,997 | 2/1961 | Carrico | 374/138 |
| 3,000,213 | 9/1961 | Eves et al. | 374/138 |
| 4,603,026 | 7/1986 | Martin | 374/185 |
| 4,749,415 | 6/1988 | Barton | 136/230 |

FOREIGN PATENT DOCUMENTS

| | | | |
|---|---|---|---|
| 0153661 | 9/1985 | European Pat. Off. | 374/138 |
| 3709739 | 10/1988 | Fed. Rep. of Germany | 374/208 |
| 0080021 | 4/1986 | Japan | 374/138 |
| 734702 | 8/1955 | United Kingdom | 374/148 |

OTHER PUBLICATIONS

Benson, A. S. "Gallium Arsenide Cryogenic Temperature Probe Makes Possible Rapid Measurements," NASA, MFS-12165 (Dec. 1971).

*Primary Examiner*—Allan N. Shoap
*Assistant Examiner*—Diego F. F. Gutierrez
*Attorney, Agent, or Firm*—J. Nevin Shaffer, Jr.; Russell D. Cubertson

[57] ABSTRACT

A temperature sensor probe is provided with a series of flow channels for deflecting a fluid to be sensed as it flows over the surface of the probe. The flow channels reduce the separation of flow from the surface of the probe thereby increasing the convective heat transfer of the probe and improving the time response of the probe. The temperature sensor probe includes a temperature sensing element housed in a probe housing. In channels are formed on the outer surface of the probe housing. In the preferred form of the invention, the housing is cylindrically shaped and the flow channels extend around the entire circumference of the housing in a spiral fashion so as to form a helical shape extending substantially the entire length of the probe housing.

20 Claims, 3 Drawing Sheets

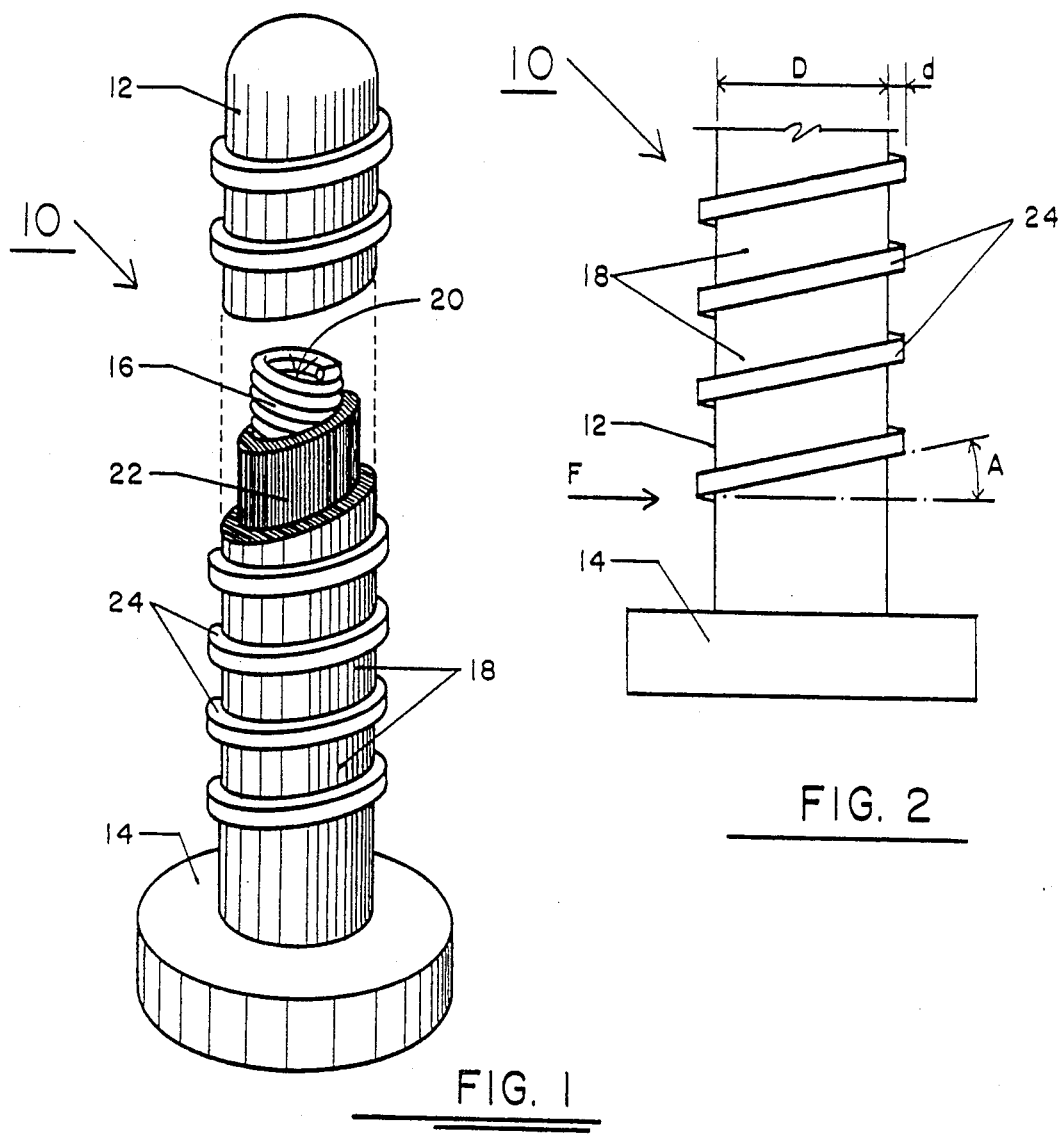
FIG. 1
FIG. 2
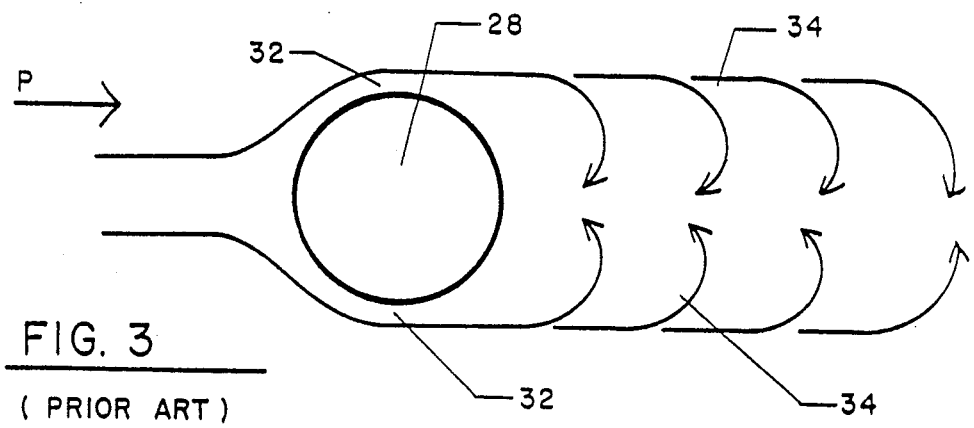
FIG. 3
(PRIOR ART)

TEMPERATURE SENSOR PROBE APPARATUS AND METHOD FOR IMPROVING TIME RESPONSE

BACKGROUND OF THE INVENTION

The invention is related to temperature sensing devices and particularly to temperature sensor probes with reduced time response to changes in the temperature of a fluid being sensed. The invention also encompasses methods for reducing the time response of temperature sensor probes.

Temperature sensing devices include generally a temperature sensor probe comprising a sensing element housed in a protective sheath or housing and a suitable measuring apparatus. The probe is adapted to be inserted into a medium to be sensed so that the probe, including the sensing element, is heated or cooled to the temperature of the medium. The temperature sensing element exhibits some characteristic that varies in a single-valued fashion with its temperature and this characteristic is measured by the measuring apparatus to provide an indication of the sensing element temperature and thus the temperature of the medium in which the element is immersed. The protective housing serves to isolate the sensing element from the corrosive effects of the medium being sensed and also serves to provide strength and durability that the sensing element itself may lack.

Electrically conductive wire coils are commonly used as temperature sensing elements in temperature sensor probes. The electrical resistance exhibited by the coil varies with the temperature of the coil and thus the measurement of the coil's resistance with appropriate resistance measuring circuitry provides an indication of the coil's temperature. The temperature sensing coil is commonly housed in a cylindrical protective sheath or housing, the coil being arranged inside the cylindrical housing in order to facilitate maximum heat transfer between the housing and the coil.

One critical factor in the performance of a temperature sensor probe is time response. The time response of a temperature probe is the time it requires for its temperature sensing element to reach a temperature representing a certain percentage of the final value of a temperature step input. That is, time response is the time it takes for the probe's temperature sensing element to reach a certain percentage of the temperature of the medium being sensed. The longer it takes a sensor probe and its temperature sensing element to reach the temperature of the medium being sensed, the worse the time response of the sensor probe.

One manner in which time response may be improved is by reducing the mass of the probe. U.S. Pat. No. 3,237,139 to Werner, U.S. Pat. No. 2,588,014 to Knudson, and U.S. Pat. No. 3,436,713 to DiNoia disclose various methods for reducing time response through reducing the mass of the temperature sensor probe.

Although time response may be improved by reducing probe mass, the extent to which the mass of the temperature probe may be reduced is limited by the strength of the probe required for a particular temperature sensing application. Many temperature sensing applications require very durable and robust probes. For example, sensing the temperature of a fluid flowing in a high velocity stream requires a sensor probe capable of withstanding the force exerted by the fluid.

Another approach to improving the time response of a temperature sensor probe is to increase the convective heat transfer coefficient of the probe. The higher the convective heat transfer coefficient of the probe, the more quickly heat is transferred between the medium whose temperature is being sensed and the temperature sensing element of the probe, and thus the quicker the time response of the probe.

Since temperature sensing coils are commonly wound into a cylindrical shape, temperature sensor probes are commonly also cylindrical. Also, the cylindrical probes, when used to sense a flowing fluid, are generally positioned extending either transversely or axially to the direction of fluid flow. However, the flow pattern of a fluid as it flows past a plain cylindrical probe in a direction perpendicular or parallel to the probe's longitudinal axis produces an unfavorable convection heat transfer coefficient for the probe. Where the flow is perpendicular to the probe, the unfavorable heat transfer coefficient results from the separation of fluid flow from the surface of the probe and the formation or shedding of large vortices on the downstream side of the probe in a phenomenon known as Karman Vortex Street. Where the flow is parallel to the cylindrical probe, that is, where the probe's longitudinal axis is aligned with the direction of flow, the fluid flow separates from the probe surface in a recirculating zone extending down a portion of the probe's length.

U.S. Pat. No. 4,467,134 to Pustell teaches one method for increasing the convective heat transfer coefficient of a plain cylindrical sensor probe to reduce time response and thereby improve probe performance in sensing the temperature of a fluid flowing past the probe. Pustell discloses a probe having an elongated cylindrical housing adapted to extend in the common position transverse to the direction of fluid flow. According to Pustell's invention, the probe is mounted coaxially within a cylindrical shroud having perforations at particular orientations with respect to the direction of fluid flow. The perforated shroud serves to increase the velocity of the fluid flowing over the cylindrical probe and the increased fluid velocity reduces flow separation from the probe thereby increasing the heat transfer between the fluid and the probe. By increasing the rate of heat transfer between the fluid and the probe, the time response of the probe is decreased.

Although the perforated shroud disclosed by Pustell does decrease the time response of the temperature sensor probe, there are several problems associated with the use of such shrouds. First, the separate shroud increases probe production costs, both with regard to materials and in the manufacturing process. Also, the perforations in the shroud must be arranged in a particular orientation with respect to the direction of fluid flow to create the desired velocity increase. Substantial deviation from the particular orientation not only defeats any benefit gained from the shroud, but may even increase the probe's time response.

The model MA-1 sensor probe manufactured by Rosemount Engineering, Inc. illustrates a method for improving the time response of a temperature sensor probe aligned axially or parallel to the direction of fluid flow. This probe includes two concentric platinum tubes with a sensor element coiled around the inner tube. The probe allows fluid being sensed to flow through the inner tube where no vortices develop and the flow remains substantially in contact with the inner tube wall, thereby increasing the heat transfer coefficient. However, the coaxial, spaced apart tube configuration substantially increases probe production costs.

SUMMARY OF THE INVENTION

It is generally an object of the invention to provide a temperature sensor probe adapted to overcome the above-described problems associated with reducing the time response of temperature sensor probes and also to provide a method for reducing the time response of temperature sensor probes.

More particularly, it is an object of the invention to provide a temperature sensor probe for sensing the temperature of a flowing fluid that exhibits improved time response with no substantial decrease in strength and durability.

Another object of the invention is to provide an elongated temperature sensor probe for sensing the temperature of a fluid flowing in a direction perpendicular or parallel to its longitudinal axis that exhibits improved time response at any angular orientation about its longitudinal axis.

A further object of the invention is to provide a method of reducing the time response of a temperature probe used to sense the temperature of a flowing fluid.

In furtherance of these objectives, a temperature probe for sensing the temperature of a flowing fluid is provided with a series of flow channels formed on the probe surface. The flow channels reduce the separation of flow from the probe surface and thereby increase the convective heat transfer coefficient of the temperature probe. The preferred temperature sensor probe includes an elongated, generally cylindrical housing that houses a suitable temperature sensing element. The flow channels are formed on the outer surface of the cylindrical housing preferably in a spiral fashion extending around the entire circumference of the cylindrical housing to form a helical shape over the length of the housing.

The temperature probe housing is adapted to house the probe's temperature sensing element in order to protect the sensing element from the medium being sensed. Accordingly, the cylindrical housing is preferably made from a suitable corrosive resistant and durable material such as a suitable metal alloy and includes an inner cavity for receiving the temperature sensing element.

The temperature sensing element may be any suitable sensing element that exhibits some readily measurable characteristic that varies in a single valued fashion with its temperature. In one preferred form of the invention, the temperature sensing element is a coil of conductive wire. The electrical resistance of the coil sensing element may be measured to provide an indication of the temperature of the coil itself and also an indication of the temperature of the medium surrounding the temperature sensor probe. The coil is also preferably arranged in the housing cavity in close proximity to the inner walls of the housing cavity to facilitate heat transfer between the housing and the coil.

According to the invention, the outer surface of the sensor probe housing is provided with a series of flow channels. The flow channels extend across the housing surface in position to deflect or channel the flow of fluid over the housing so as to break down and trap the vortices that would otherwise be formed as fluid flows over the housing. The channelled flow remains in a laminar pattern attached to the housing over a larger portion of the total housing surface, increasing the convective heat transfer coefficient of the probe and improving the probe's time response to changes in fluid temperature. In order to produce the desired flow deflection, the flow channels are formed on the probe housing so as to extend at an acute angle to the direction of fluid flow when the probe is properly positioned in the flow stream. For example, the preferred cylindrical housing is adapted to extend transversely or axially into the fluid stream with its longitudinal axis perpendicular or parallel to the direction of fluid flow; and the flow channels are formed on the housing so as to extend at an acute angle to a plane extending perpendicular to the longitudinal axis of the housing.

In the preferred form of the invention with the probe having an elongated cylindrical housing, the flow channels are continuous, spiraling around the entire circumference of the housing and extending in the spiralling fashion the entire length of the cylindrical housing. The preferred flow channels are thus formed by a single continuous groove or channel having a substantially helical shape, adjacent flow channels being adjacent spirals of the continuous channel.

The flow channels may be formed by adding a series of ridges or protuberances to a housing, the channels being formed between adjacent ridges or protuberances. However, the preferred method of producing the desired flow channels is by cutting or otherwise machining the channels into the outer surface of a plain surfaced housing. Plain cylindrical sensor probes may be retro-fitted with the desired flow channels simply by machining a helical channel into the cylinder similarly to machining a connector thread.

A cylindrical temperature probe equipped with flow channels in accordance with the invention exhibits a significantly decreased time response to changes in the temperature of the fluid being sensed. Also, the preferred continuous helical flow channel embodiment of the probe does not require any particular angular orientation about its longitudinal axis with respect to the direction of fluid flow in order to produce the desired flow channeling effect. With the probe extending transversely or axially with respect to the direction of fluid flow, the channels are maintained at the proper deflecting angle regardless of the angular orientation of the probe. Furthermore, in some cases the continuous helical channel and ridge adds to the stiffness and strength of the temperature sensor probe.

These and other objects, advantages, and features of the invention will be apparent from the following description of the preferred embodiment, considered along with the accompanying drawings.

BRIEF DESCRIPTION OF THE DRAWINGS

FIG. 1 is a view in perspective of a temperature sensor probe embodying the principles of the invention, partially cut away to show the probe's temperature sensing element.

FIG. 2 is a view in side elevation of the temperature sensor probe illustrated in FIG. 1.

FIG. 3 is a mostly schematic end view of a prior art temperature sensor probe indicating the flow of fluid around the probe.

DESCRIPTION OF THE PREFERRED EMBODIMENTS

Figure 4:
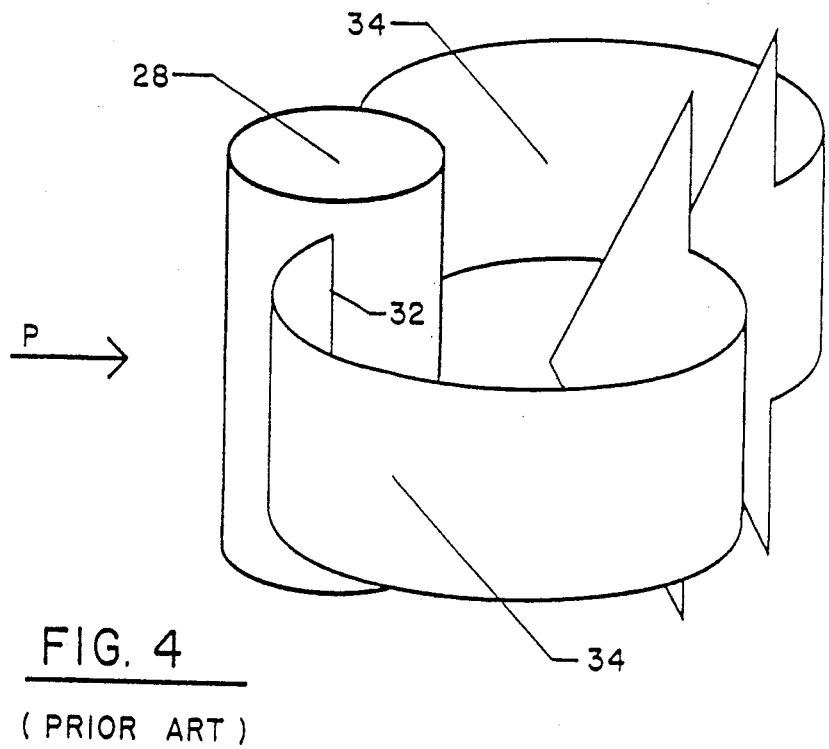
FIG. 4 is a mostly schematic view in perspective of the prior art temperature sensor probe shown in FIG. 3 indicating the flow of fluid around the probe.

FIGS. 1 and 2 illustrate a temperature sensor probe, generally indicated by reference numeral 10, embodying the principles of the invention. The probe 10 includes a generally cylindrical housing 12 mounted on a base 14 and housing a temperature sensing element 16. In accordance with the invention, the temperature sensor probe 10 also includes a series of flow channels 18 formed on the outer surface of the cylindrical housing 12.

The cylindrical housing 12 includes an inner cavity 20 for receiving the temperature sensing element 16. The housing 12 serves to isolate the temperature sensing element 16 from a fluid being sensed and to provide the probe 10 with the strength and durability required in many temperature sensing applications. In the preferred form of the invention, the cylindrical housing 12 is made from a suitable rigid and durable material such as a suitable steel alloy. Stainless steel alloys, titanium alloys, nickel alloys, and copper alloys are all examples of suitable housing materials, although other materials may also be used.

In the illustrated preferred form of the invention, the temperature sensing element 16 is a coil of electrically conductive wire insulated from the housing 12 by a suitable electrical insulating material 22. The resistance of the coil to electrical current varies in a single-valued fashion with the temperature of the coil and thus the resistance to electrical current exhibited by the coil may be measured to provide an indication of the coil temperature. Since the cylindrical housing 12 is commonly made from an electrically conductive metal, the insulating material 22 is provided to electrically isolate the sensing coil from the housing.

Although the sensing element 16 is illustrated as being an electrically conductive coil, a temperature sensor probe embodying the principles of the invention may include any other suitable type of temperature sensing element. For example, a temperature sensor probe according to the invention may include a thermocouple type temperature sensing element having a junction of two dissimilar metals, or a gas bulb which contracts or expands indicating the temperature in the form of a pressure reading.

The temperature sensor probe 10 includes a series of flow channels 18 formed o the outer surface of the cylindrical housing 12. The flow channels 18 are formed on the housing 12 so as to extend at an acute angle to the direction of fluid flow when the probe is properly positioned in a fluid being sensed, either transversely or axially with respect to the direction of flow. The elongated cylindrical probe shown in FIGS. 1 and 2 is particularly adapted to sense the temperature of a fluid flowing perpendicularly with respect to the longitudinal axis of the probe 10, direction F in FIG. 2, for example. Referring to FIG. 2, the angle A indicates the angle of the flow channels 18 with respect to the fluid flow in direction F. A temperature probe pursuant to the invention will indicate a time response improvement for angles A between 0° and 90°, or any acute angle. The optimum angle A for a particular application will depend on the physical characteristics of the fluid being sensed and the velocity of flow. The preferred depth d of the flow channels 18 is between 0 and 1 times the diameter D of the bare cylinder (FIG. 2) or $0 < d < D$ although the channel depth d may be greater for particular applications.

The flow channels 18, in the illustrated form of the invention, spiral continuously around the entire circumference of the cylindrical housing 12 and along substantially the entire length of the housing so as to form a helical shape. Ridges or protuberances 24 are formed between adjacent spirals of the helical-shaped flow channel 18.

In the preferred form of the invention, the flow channels 18 are cut or otherwise machined in an appropriate manner into the cylindrical housing 12. The continuous helical-shaped flow channel shown in FIGS. 1 and 2 may be machined into the surface of a plain cylindrical housing with an appropriate die similarly to machining a connector type thread. However, any suitable method may be used to form the channels. For example, ridges or protuberances may be formed on the surface of a plain cylindrical housing, the desired flow channels being formed between adjacent ridges.

FIGS. 3 and 4 represent schematically the flow of a fluid being sensed over a prior art temperature sensor probe 28, the direction of flow, indicated by arrow P, being perpendicular to the longitudinal axis of the elongated cylindrical probe. As the fluid being sensed flows past the prior art cylindrical probe 28, it remains substantially attached over substantially the forward half of the cylinder. However, on the lee or downstream side of the cylindrical probe 28, the fluid flow separates from the cylinder at point 32 due to an adverse pressure gradient past the point of separation. Past the separation point 32, the fluid does not have enough momentum to stay attached to the plain cylindrical probe 28. The separated fluid forms large symmetrical vortices 34 on the lee or downstream side of the probe 28 in a phenomenon known as Karman Vortex Street. The separated flow and vortex shedding results in an unfavorable heat transfer coefficient for the probe 28.

Figure 5:
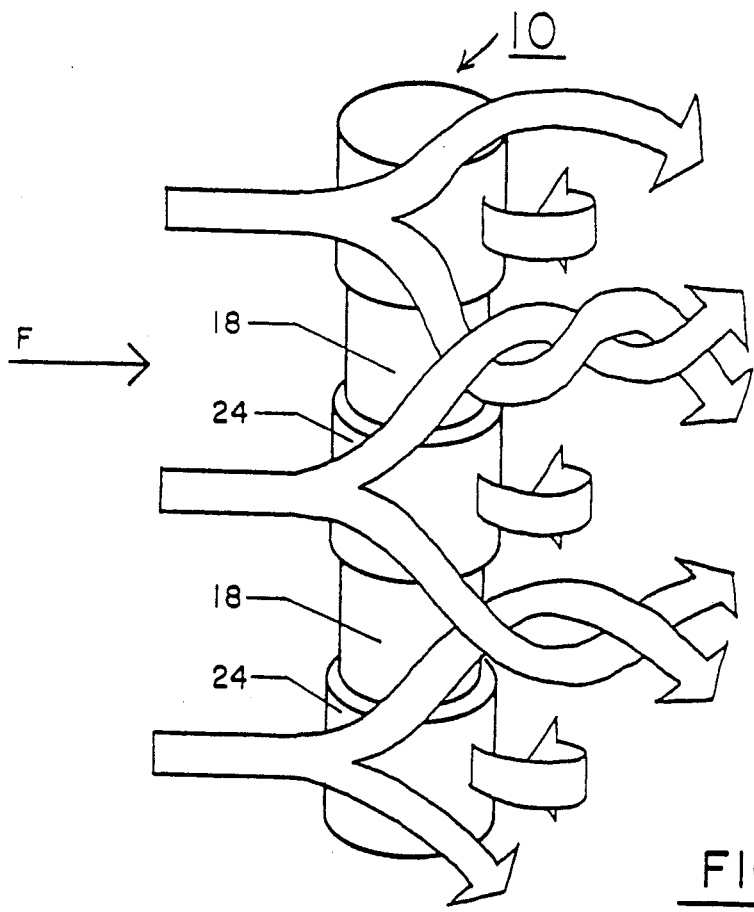
FIG. 5 is a mostly schematic view in perspective of the temperature sensor probe of FIG. 1 indicating the flow of fluid around the surface of the probe.

The operation of the temperature probe embodying the principles of the invention may be described with reference to FIG. 5, which illustrates schematically the flow of the fluid being sensed over the temperature sensor probe 10 of FIGS. 1 and 2. The temperature sensor probe 10 extends transverse or perpendicular to the direction of fluid flow indicated in FIG. 5 by arrow F. The channels 18 formed between adjacent spirals of the ridges or protuberances 24 act to break down and trap the vortices being shed in the Karman Vortex Street. The channelled flow stays attached to the surface of the temperature sensor probe 10 reducing the pressure or form drag of the probe and increasing its heat transfer coefficient. It will readily be appreciated that the effect of reducing drag and increasing the heat transfer coefficient of the probe is independent of the direction of fluid flow transverse to the elongated probe because the probe 10 is symmetrical about its longitudinal axis. Thus the probe 10 requires no particular angular orientation to the fluid flow to obtain the increased heat transfer coefficient and reduced time response.

Figure 6:
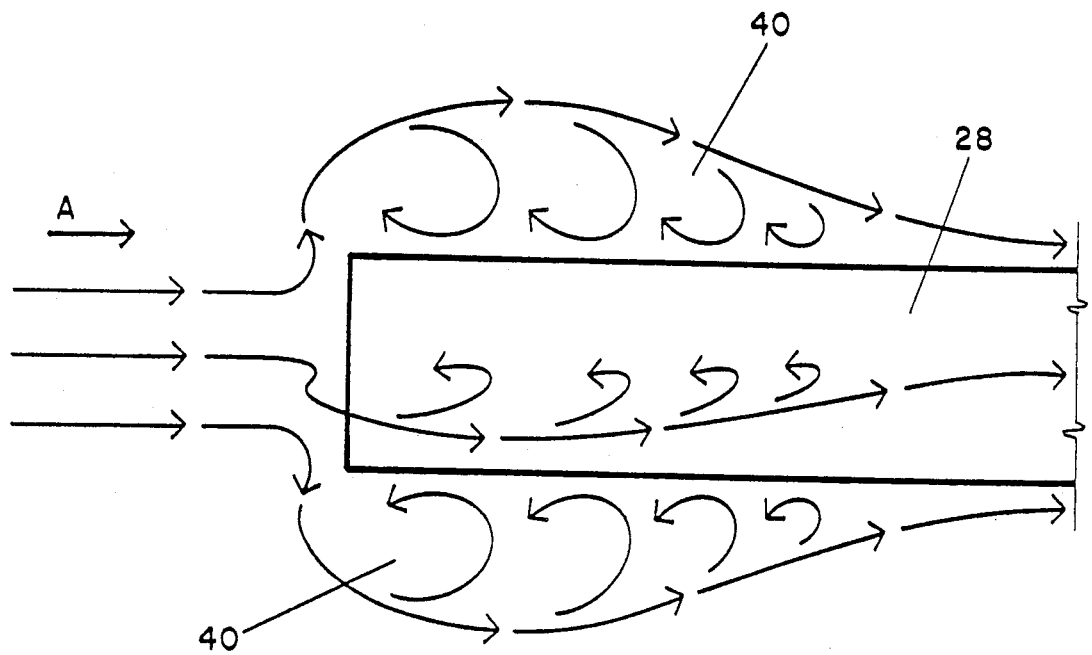
FIG. 6 is a mostly schematic view in side elevation of a prior art temperature sensor probe axially aligned with the direction of fluid flow, indicating the flow of fluid around the probe.

FIG. 6 illustrates schematically the flow of a fluid being sensed over a prior art temperature sensor probe 28 when the plain cylindrical probe is axially aligned with, or parallel to, the direction of flow, the direction of flow being indicated by arrow A. As the fluid being sensed flows past the probe 28, a recirculating zone 40 forms along a substantial portion of the probe's length. As indicated in FIG. 6, the flow is separated from the probe's surface in the recirculating zone 40. This flow separation gives the probe an unfavorable heat transfer coefficient and increases its time response.

Figure 7:
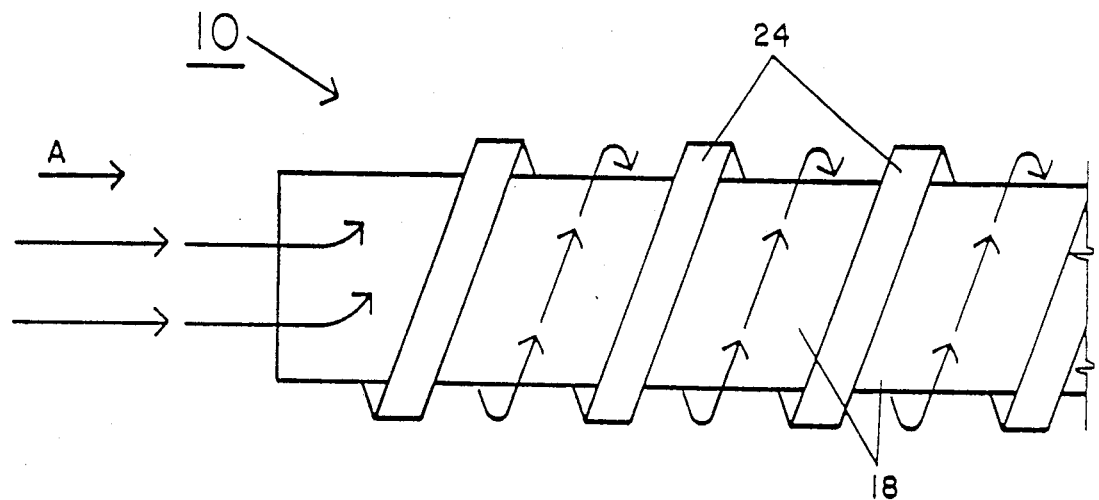
FIG. 7 is a mostly schematic view in side elevation of a probe embodying the principles of the invention, indicating the flow of fluid around the probe when the probe is axially aligned with the direction of fluid flow.

FIG. 7 shows the temperature sensor probe 10 according to the invention axially aligned with, or parallel to, the direction of flow indicated by arrow A. The channels 18 formed between adjacent spirals of the ridges 24 act to swirl the flow around the probe, breaking down the recirculating zone (40 in FIG. 6) and increasing the probe's heat transfer coefficient.

Although the invention has been described above with temperature sensor probes having a generally cylindrical housing, non-cylindrical probes also benefit from the angled flow channels as described. Generally, a probe or probe housing shape that has a coefficient of drag $C_d$ greater than that of a cylinder (1.0 to flow transverse to the longitudinal axis of the probe) benefits more, in terms of time response, from the angled flow channels than a cylindrical probe, while a probe shape having a lesser coefficient of drag benefits to a lesser extent.

The above described preferred embodiments are intended to illustrate the principles of the invention, but not to limit the scope of the invention. Various other embodiments and modifications to these preferred embodiments may be made by those skilled in the art, without departing from the scope of the following claims.

What is claimed is:

1. A temperature sensor probe for sensing the temperature of a flowing fluid, the temperature sensor probe comprising:
   A. a temperature sensing element;
   B. temperature probe housing means for housing the temperature sensing element so as to isolate the sensing element from direct contact with the fluid being sensed; and
   C. flow channeling means formed on the outer surface of the housing means at an acute angle to the direction of fluid flow for deflecting the fluid over the outer surface of the housing means as the fluid flows over said outer surface so as to reduce the separation of fluid flow from the outer surface of the housing and thereby increase the convective heat transfer coefficient of the housing means.

2. The temperature sensor probe of claim 1 wherein the flow channeling means includes a series of flow channels formed on the outer surface of the housing means.

3. The temperature sensor probe of claim 2 wherein the housing means is an elongated, generally cylindrical housing member and wherein the flow channels are formed into the cylindrical housing member.

4. The temperature sensor probe of claim 3 wherein the flow channels are formed into the cylindrical housing member in a spiral fashion, extending around the entire circumference of the housing member to form a helical shape along substantially the entire length of the housing member.

5. The temperature sensor probe of claim 4 wherein the flow channels extend at substantially an acute angle to a plane extending perpendicular to the longitudinal axis of the cylindrical housing.

6. The temperature sensor probe of claim 5 wherein the flow channels are of a uniform depth into the outer surface of the 11 housing member of between 0 and 1 times the diameter of the bare cylindrical housing.

7. The temperature sensor probe of claim 6 wherein the housing member includes an inner cavity, the temperature sensing element being contained in the cavity.

8. The temperature sensor probe of claim 7 wherein the sensing element is a coil of electrically conductive material whose resistance to electrical current varies in a substantially single-valued fashion with its temperature.

9. The temperature sensor probe of claim 8 including an electrical insulating material interposed between the housing member and the electrical coil.

10. A housing for housing the temperature sensing element of a temperature sensor probe for sensing the temperature of a flowing fluid, the housing comprising:
    A. a substantially cylindrical elongated housing member having an inner cavity adapted for receiving a temperature sensing element; and
    B. flow channeling means formed into the outer surface of the housing member at an acute angle to the direction of fluid flow for deflecting fluid over the outer surface of the housing member as the fluid flows over said outer surface so as to reduce the separation of fluid flow from the outer surface of the housing and thereby increase the convective heat transfer coefficient of the housing.

11. The temperature sensor probe of claim 10 wherein the flow channeling means includes a series of flow channels formed into the outer surface of the cylindrical housing.

12. The temperature sensor probe of claim 11 wherein the flow channels are formed into the cylindrical housing member in a spiral fashion, extending around the entire circumference of the housing member to for a helical shape along substantially the entire length of the housing member.

13. The temperature sensor probe of claim 12 wherein the flow channels extend at substantially an acute angle to a plane extending perpendicular to the longitudinal axis of the cylindrical housing.

14. The temperature sensor probe of claim 13 wherein the flow channels are of a uniform depth into the outer surface of the housing member of between 0 and 1 times the diameter of the bare cylindrical housing.

15. The housing of claim 14 wherein the housing member is made from a suitable metal alloy.

16. A method of reducing the time response of a temperature sensor probe to temperature changes of a fluid flowing past the probe, the method comprising the step of:
    A. deflecting the fluid over the outer surface of the probe at an acute angle to the direction of fluid flow as the fluid flows along said surface so as to reduce the separation of fluid from the outer surface of the probe, thereby increasing the convective heat transfer coefficient of the probe.

17. The method of claim 16 wherein the step of deflecting the fluid flow includes channeling the fluid being sensed by a series of flow channels formed in the outer surface of the sensor probe.

18. The method of claim 17 wherein the temperature sensor probe is generally cylindrical in shape and the flow channels are formed in a spiral fashion extending around the entire circumference of the cylindrical probe to form a helical shape along substantially the entire length of the sensor probe.

19. The method of claim 18 wherein the fluid flow being deflected is in a direction perpendicular to the longitudinal axis of the probe.

20. The method of claim 18 wherein the fluid flow being deflected is in a direction parallel to the longitudinal axis of the probe.

* * * * *

UNITED STATES PATENT AND TRADEMARK OFFICE
CERTIFICATE OF CORRECTION

PATENT NO. : 4,991,976
DATED : February 12, 1991
INVENTOR(S) : Joe D. Byles

It is certified that error appears in the above-identified patent and that said Letters Patent is hereby corrected as shown below:

Column 8, claim 6, line 5, delete "11" before "housing".

Column 8, claim 10, line 26, 2nd occurence, insert --the-- before "fluid."

Column 8, claim 12, line 39, change "for" to --form--.

Signed and Sealed this

Twenty-first Day of July, 1992

Attest:

DOUGLAS B. COMER

Attesting Officer

Acting Commissioner of Patents and Trademarks